United States Patent
Wahbeh

(10) Patent No.: US 12,405,509 B2
(45) Date of Patent: Sep. 2, 2025

(54) BRIGHT SOURCES FOR PURE PHOTONS ENTANGLEMENT

(71) Applicant: OZ Optics Ltd., Ottawa (CA)

(72) Inventor: Mamoun Wahbeh, Stittsville (CA)

(73) Assignee: OZ Optics Ltd., Ottawa (CA)

( * ) Notice: Subject to any disclaimer, the term of this patent is extended or adjusted under 35 U.S.C. 154(b) by 91 days.

(21) Appl. No.: 18/203,263

(22) Filed: May 30, 2023

(65) Prior Publication Data
US 2023/0384647 A1 Nov. 30, 2023

(30) Foreign Application Priority Data
May 30, 2022 (CA) ...................................... 3160539

(51) Int. Cl.
*G02F 1/35* (2006.01)
*G02F 1/355* (2006.01)
(Continued)

(52) U.S. Cl.
CPC .......... *G02F 1/3546* (2021.01); *G02F 1/3503* (2021.01); *G02F 1/3505* (2021.01);
(Continued)

(58) Field of Classification Search
CPC .... G02F 1/3775; G02F 1/3503; G02F 1/3505; G02F 1/3526; G02F 1/3546; G02F 1/3558; G02F 1/395
See application file for complete search history.

(56) References Cited

U.S. PATENT DOCUMENTS

| | | | | |
|---|---|---|---|---|
| 7,489,436 B1 * | 2/2009 | Fiorentino | ................ | G02F 1/39 |
| | | | | 359/332 |
| 7,859,744 B2 * | 12/2010 | Trifonov | ................... | G02F 1/39 |
| | | | | 359/332 |

(Continued)

OTHER PUBLICATIONS

Agnesi, C., et al., "All-fiber Self-compensating Polarization Encoder for Quantum Key Distribution," Optics Letters 44 (10):2398-2401 (May 2019).

(Continued)

*Primary Examiner* — Rhonda S Peace
(74) *Attorney, Agent, or Firm* — Bauer and Joseph; Thomas Joseph

(57) ABSTRACT

Bright entangled photon sources including an alignment-free, fiber-based, mechanically-rugged and generic interferometric module are disclosed. The inherent phase-stability of a Sagnac interferometer is deployed. High downconversion efficiency of periodically poled nonlinear-waveguides is combined with the optical gain of semiconductor optical amplifiers and immunity of fiber optics. A single compact interferometric engine combines these attributes, allowing highly stable, integrable and bright polarization entangled-photon sources operating at room temperature. Using a minimum number of in-line optical parts, the compact module is based on a novel method that enhances the long-term stability and efficiency without compromising the entanglement quality. Besides energy entanglement, polarization entanglement is presented and set through the operational conditions. An optional periodically poled nonlinear waveguide can be hosted to achieve the desired spectral bandwidth and photons generation rate. The result is a zero-maintenance, lightweight, low-power consumption engine of compact and fully-integrable bright polarization-entangled photon sources.

27 Claims, 8 Drawing Sheets

(51) Int. Cl.
*G02F 1/39* (2006.01)
*H04B 10/70* (2013.01)
(52) U.S. Cl.
CPC .......... *G02F 1/3526* (2013.01); *G02F 1/3558* (2013.01); *G02F 1/395* (2013.01); *H04B 10/70* (2013.01)

(56) References Cited

U.S. PATENT DOCUMENTS

| | | | | |
|---|---|---|---|---|
| 11,719,994 | B2* | 8/2023 | Zhou | G02F 1/3526 385/122 |
| 2023/0194955 | A1* | 6/2023 | Zhou | G02F 1/3526 385/122 |
| 2023/0384647 | A1* | 11/2023 | Wahbeh | G02F 1/395 |

OTHER PUBLICATIONS

Bourgoin, J., et al., "Experimental Quantum Key Distribution With Simulated Ground-to-satellite Photon Losses and Processing Limitations," Physical Review A 1-12, (Dec. 2015).
Burnham, D.C. and Weinberg, D.L., "Observation of Simultaneity in Parametric Production of Optical Photon Pairs," Physical Review Letters 25(2):84-87, (Jul. 1970).
Cabrejo-Ponce, M., et al., "GHz-pulsed Source of Entangled Photons for Reconfigurable Quantum Networks," Quantum Science and Technology 7:1-8, (Jan. 2022).
Demmer, M., et al., "Richard Feynman: Simulating Physics With Computers," International Journal of Physics 1-8, (2008).
Feynman, R.P., "Simulating Physics With Computers," International Journal of Theoretical Physics 21:467-488, (May 1982).
Fiorentino, M., et al., "Generation of Ultrabright Tunable Polarization Entanglement Without Spatial, Spectral, or Temporal Constraints," Physical Review A 1-10, (2004).
Hentschel, M., et al., "Three-color Sagnac Source of Polarization-entangled Photon Pairs," Optics Express 17 (25):23153-23159, (Dec. 2009).
Horn, R. and Jennewein, T., "Auto-balancing and Robust Interferometer Designs for Polarization Entangled Photon Sources," Optics Express 27(12):17369-17376, (Jun. 2019).
Kaiser, F., et al., "Quantum Optical Frequency Up-conversion for Polarisation Entangled Qubits: Towards Interconnected Quantum Information Devices," Optics Express 27(18):25603-25610 (Sep. 2019).
Kim, T., et al., "Phase-stable Source of Polarization-entangled Photons Using a Polarization Sagnac Interferometer," Physical Review A 73:1-5, (Jan. 2006).
Kim, Y., et al., "Interferometric Bell-state Preparation Using Femtosecond-pulse-pumped Spontaneous Parametric Downconversion," Physical Review A 63:062301-1-062301-11, (May 2001).
Kwiat, P., et al., "Proposal for a Loophole-free Bell Inequality Experiment," Physical Review A 49(5):3209-3220, (May 1994).
Kwiat, P.G., et al., "New High-intensity Source of Polarization-entangled Photon Pairs," Physical Review Letters 75 (24):4337-4341, (Dec. 1995).
Kwiat, P.G., et al., "Ultrabright Source of Polarization-entangled Photons," Physical Review A 60(2):R773-R776, (Aug. 1999).
Lee, Y.S., et al., "Sagnac-type Entangled Photon Source Using Only Conventional Polarization Optics," Quantum Science and Technology 6(2):1-17, (Jun. 2020).
Lim, H.C., et al., "Broadband Source of Telecom-band Polarization-entangled Photon-pairs for Wavelength-multiplexed Entanglement Distribution," Optics Express 16(20):16052-16057 (Sep. 2008).
Martin, A., et al., "A Polarization Entangled Photon-pair Source Based on a type-II PPLN Waveguide Emitting at a Telecom Wavelength," New Journal of Physics 12:1-13, (2010).
Meyer-Scott, E., et al., "High-performance Source of Spectrally Pure, Polarization Entangled Photon Pairs Based on Hybrid Integrated-bulk Optics," Optics Express 26(25):32475-32490 (Dec. 2018).
Meyer-Scott, E., et al., "How to Implement Decoy-state Quantum Key Distribution for a Satellite Uplink With 50 dB Channel Loss," Physical Review A 1-9, (Dec. 2011).
Predojevic, A., et al., "Pulsed Sagnac Source of Polarization Entangled Photon Pairs," Optics Express 20 (22):25022-25029 (Oct. 2012).
Sanaka, K., et al., "New High-Efficiency Source of Photon Pairs for Engineering Quantum Entanglement," Physical Review Letters 86:1-4, (Jun. 2001).
Shi, B.S. and Tomita, A., "Generation of a Pulsed Polarization Entangled Photon Pair Using a Sagnac Interferometer," Physical Review A 69:013803-1-013803-4, (Jan. 2004).
Slussarenko, S. and Pryde, G.J., "Photonic Quantum Information Processing: A Concise Review," Applied Physics Reviews 6 1-19, (Oct. 2019).
Steinlechner, F., et al., "Efficient Heralding of Polarization-entangled Photons From Type-0 and Type-II Spontaneous Parametric Downconversion in Periodically Poled KTiOPO4," Optical Society of America B 31 (9):2068-2076, (Sep. 2014).
Steinlechner, F., et al., "Phase-stable Source of Polarization-entangled Photons in a Linear Double-pass Configuration," Optics Express 21(10):11943-11951, (May 2013).
Trojek, P. and Weinfurter, H., "Collinear Source of Polarization-entangled Photon Pairs at Nondegenerate Wavelengths," Applied Physics Letters 92:211103-1-211103-3, (May 2008).
Trojek, P., et al., "Compact Source of Polarization-entangled Photon Pairs," Optics Express 12(2):276-281, (Jan. 2004).
Understanding Properties of Atoms, Molecules and Materials, By Pranab Sarkar, Sankar Prasad Bhattacharyya, p. 278 (2022).
Vergyris, P., et al., "Fibre Based Hyperentanglement Generation for Dense Wavelength Division Multiplexing," Quantum Science and Technology 4:1-7, (2019).
Vergyris, P., et al., "Fully Guided-wave Photon Pair Source for Quantum Applications," Quantum Science and Technology 1-16, (Jun. 2017).
Wahbeh, M. and Kashyap, R., "Purity of the Single Frequency Mode of a Hybrid Semiconductor-fiber Laser," Optics Express 23(12):16084-16095, (Jun. 2015).
Muneer Alshowkan et al., "Broadband polarization-entangled source for C+L-band flex-grid quantum networks", Optics Letters, vol. 47, No. 24 / Dec. 15, 2022.

* cited by examiner

BRIGHT SOURCES FOR PURE PHOTONS ENTANGLEMENT

CROSS REFERENCE TO RELATED APPLICATION

This application claims the benefit of Canadian Patent Application No. CA 3,160,539, entitled "BRIGHT SOURCES FOR PURE PHOTONS ENTANGLEMENT", filed May 30, 2022, which is incorporated herein by reference.

TECHNICAL FIELD

The present disclosure sets forth a versatile product line for generating high-quality photons polarization/energy entanglement at various wavelengths. The generated photon pairs can be distributed in broad and narrow spectral bandwidths for either stand-alone operation or integration purposes in satellite links and interlinks.

BACKGROUND OF THE INVENTION

Moore's law predicts the pace of growth in computing power via doubling chip densities every two years. This prediction is not going to be valid anymore as silicon-based transistors are fast approaching the limits of miniaturization at atomic levels. In 1982 Richard Feynman suggested the quantum effects such as superposition and entanglement could be harnessed and deployed in computation. Quantum technology has brought computers and the communication industry on the verge of the next technological transformation. The information distribution and data processing will be armored with a new concept. That is quantum entanglement that will put quantum technology beyond the capabilities of their classical counterparts. Powerful parallel computational algorithms can be enabled to overcome the limitations of sequential classical processors.

Photonic platforms have been proven as a natural stream due to their low operating noise and high-fidelity control over long-distance transmission. As a result, entangled photons sources are nominated to occupy an essential role in emerging quantum computing and secure communication. In other words, entangled photon sources operating at room temperature can be key for portable quantum technology.

Spontaneous parametric down conversion (SPDC) is one of the most passive optical processes implemented in generating correlated photons. In general, the SPDC process occurs in birefringent crystals and waveguides that have a large second-order nonlinearity, $\chi^{(2)}$. In SPDC, a pump photon at high frequency $\omega_p$ travelling in a non-linear medium is converted into two correlated lower energy photons. The signal and idler photons, $\omega_s$ and $\omega_i$, are referred to as photon pairs, where the energy and momentum, $\vec{K}$, are conserved. Energy conservation is expressed by $$\omega_p = \omega_s + \omega_i \qquad \text{EQ. 1}$$

Momentum conservation that is also called phase matching requires $$\vec{K}_p = \vec{K}_s + \vec{K}_i \qquad \text{EQ. 2}$$

where $$|\vec{K}_p| = \frac{2\pi}{\lambda}$$

and $\lambda$, is the wavelength.

When these three photons, $\omega_s, \omega_i$ and $\omega_p$ travel in the same direction, the phase matching is colinear. Given the dispersion of nonlinear optical media, optical birefringence is deployed to equalize the speeds of those three photons through phase matching.

Birefringence refers to the dependence of the refractive index of anisotropic material on the polarization direction. Consequently, phase matching is polarization dependent and hence the presence of Type-0, Type-1 and Type-2 phase matching. Type-0 SPDC is defined by parallel polarization of the pump photon, signal and idler photons. The polarization of the pump photon in Type-1 process is orthogonal to that of both the signal and idler photons. In Type-2 SPDC, the polarization of the pump photon is orthogonal to the polarization of either the signal or idler while parallel to the other.

Photon or light polarization defines the direction of the electric component of the electromagnetic wave. Introducing the photons reference frame, the photon polarization state, $|\psi\rangle$, described by the projections of the electric field, $\alpha$ and $\beta$, onto the vertical and horizontal basis states $|H\rangle$ and $|V\rangle$ respectively, is given as $$|\psi\rangle = e^{i\theta}(\alpha|H\rangle + e^{i\phi}\beta|V\rangle) \qquad \text{EQ. 3}$$

where are $\phi$ is the relative phase angle and $\theta$ is the global phase angle.

In colinear crystals, and despite the strong dispersion, phase matching is achieved through material engineering using quasi-phase matching (QPM) technique. The concept of the QPM is based on the periodic reversal of the local electric field in ferroelectric nonlinear crystals. This enhances the flow probability of the pump wave energy into the daughter waves while interacting with considerably longer path in the crystal. Periodically poled crystals are thus produced as bulk or with incorporated channel waveguides ensuring better optical confinement. A large optical loss is inevitably encountered when collecting SPDC photon pairs, generated in colinear bulk crystals. However, they have been implemented in a wide range of applications and used in various polarization-entangled photon sources.

Many approaches for producing polarization-entangled photon pairs through SPDC process have been proposed over the past two decades. In the case of colinear SPDC crystals, polarization entanglement can be obtained based on three main configurations using; (a) type-2 phase matching in a single crystal or double-pass pump in a single type-0 crystal, (b) two crossed type-0 or type-1 crystals (c) interferometric schemes, namely Mach-Zehnder, Franson, and Sagnac interferometers. The ubiquity of the latter method in many state-of-art quantum optics experiments and applications has in part been driven by the advantages of using colinear periodically poled crystals. Different phase matching types are implemented to achieve polarization entanglement. The interferometric concept was firstly conceptualized by Kwiat and coworker and followed by the experimental demonstrations cited above. Amongst these schemes, the inherent phase stability of Sagnac interferometers is remarkable. It is attributed to the common interferometric path of pump photons and photon pairs that are combined into a single spatial mode. This allows for high-quality polarization-entanglement generation. The interferometric configuration enables photon pairs separation into different spatial modes with no post-selective detection. Fiber integration into such interferometric sources is therefore motivated by the self-compensation effect and the need to overcome the tedious optical alignment of discrete optical components. This is usually associated with bulky and susceptible opto-mechanical components.

SUMMARY OF THE INVENTION

The present invention sets forth a versatile product line for generating high-quality photons polarization/energy entanglement at various wavelengths. The generated photon pairs can be distributed in broad and narrow spectral bandwidths. The remarkable efficiency and stability of such sources capitalize on the high optical confinement within a periodically poled nonlinear waveguide (PPNW). In one aspect, this is combined with the self-compensation effect of a Sagnac all-in-fiber interferometer. Thus, bright, high-performance and low-noise entangled photon sources operating at room temperature can be constructed. Such sources are alignment-free and can be offered with built-in pump diodes for either stand-alone operation or integration purposes in satellite links and interlinks.

In one embodiment, all pump photons and generated daughter photons are confined to a crystal waveguide and routed via polarization maintaining (PM) fibers and are efficiently coupled to their output ports. Therefore, a larger probability of pairs generation can be achieved with a higher flux of photon pairs within a single-spatial mode, which can be routed efficiently throughout the system.

In a further example embodiment, there is provided a host engine of compact, alignment-free and efficient entangled photon sources. The photon pairs' spectral specifications including the photons wavelengths, bandwidth and generation rate can be tailored through the selection of the PPNW material and SPDC type.

In previous work, a type-0 periodically poled lithium niobate (PPLN) waveguide was placed in a fiber-based polarization Sagnac interferometer. However, the arrangement is constructed using three discrete devices, namely a pump laser source/module, fiber-coupled polarizing beam-splitter (PBS) and wavelength division multiplexer (WDM) unit. In order to achieve a reliable and high-quality polarization-entangled photon source, the following drawbacks have to be addressed:

1—The use of discrete units increases the optical insertion loss, reduces the photon collection and delivery and thus degrades the efficiency and brightness. The lack of in-line pump-removal filters is another flaw, where such filters are necessary to reduce the measurements noise floor as the WDM pump-suppression ratio is limited. However, additional optical loss could have been introduced if the WDM was followed by a separate filter unit.

2—An isolator following the pump laser can be added to protect the pump laser itself as the output power is routed back through Sagnac interferometer. An isolator at short pump wavelengths such as 775 nm or 405 nm can imply size and cost constraints preventing from integrating the pump laser source into a compact and low-cost module.

3—The pump laser and the subsequent WDM unit were pigtailed with a single-mode (SM) fiber, which is directly routed to the PBS unit, where the pump input and photon pairs counter-propagate via this fiber. The use of a SM fiber here is expected to harm the stability of the source because the photon pairs creation pertains to the polarization condition of pump photons at the PBS input. On the other hand, replacing the SM fiber with a PM fiber at the common port of the PBS unit will introduce a temporal walk-off due to the fiber beat length. This reduces photon pairs' indistinguishability and degrades the entanglement and source quality.

In one aspect of the present invention, the aforementioned design issues are all addressed while the three main devices are physically integrated into a single compact module, referred to as an engine. This engine can also comprise noise-suppression filters. The engine is designed to be a host of various PPNWs with different spectral and brightness capabilities.

An ideal source of entangled photon pairs should have excellent fidelity, negligible noise floor, highly-stable performance and a tailored spectral range. In some quantum applications such as satellite links, bright sources generating counts on the order of sub-THz and THz are necessary to handle and relieve the processing limitations due to high transmission losses, e.g., >50 dB. In addition, zero maintenance, lightweight, low-power consumption and compact physical size are complementary requirements that should preferably be met. With that in mind, entangled-photon sources are presented in one aspect of the present invention using a minimum number of components integrated into a single unit/engine. This ensures entanglement purity, photons conversion efficiency and source reliability. In one example embodiment, the host engine permits the realization of such sources through:

1—A fiber-based polarization Sagnac interferometer is implemented. The need for an active phase-stabilization system is eliminated due to its intrinsic phase-stability or the so-called self-compensation effect of a Sagnac interferometer.

2—SPDC process in periodically-poled nonlinear crystals is used for producing entanglement. Waveguides are inscribed in such crystals to achieve high optical confinement. Consequently, high conversion efficiency and outstanding photon-pairs generation rate at a given pump power level can be obtained. The waveguide can be optically coupled to PM fiber with low insertion loss to build efficient and bright sources.

3—The interferometer can be constructed using a PM fiber while the waveguide is placed in the interferometric loop. The optical paths of polarization-entangled photon pairs are balanced to some extent satisfying the time tagging unit requirement. The interferometric PM fiber can be cross-spliced at two specific points if needed to eliminate any temporal walk-off. In an exemplary embodiment, the PM fiber exhibits Gaussian single-mode propagation for both pump and photon pairs wavelengths, such as a photonic crystal fiber (PCF). The PM fiber can also be a special PM fiber that behaves as a weak multi-mode fiber at short wavelengths, involved in the SPDC, while single-mode transmission is guaranteed for the photons at longer wavelengths.

4—The WDM and PBS units can be integrated into a single compact module, thereby eliminating the use of a fiber connecting the pump laser to the PBS unit through the WDM. This arrangement can also serve the purpose of insertion-loss reduction. Higher conversion efficiency and better heralding sources using a single compact module is thus allowed.

5—Built-in pump-removal filters can also be incorporated into the engine and placed at the photon pairs output ports without additional optical loss.

6—The nature of this interferometric configuration can involve relatively high optical power routed back to the pump laser diode. This back-routed power cannot be handled without damaging the spectral behavior and laser diode lifetime. Whether a stabilized Fabry-Perot laser is used or an expensive laser such a distributed-feedback laser is implemented, the back-routed power could be suppressed via an isolator added to the pump. However, a Faraday rotator ensuring a high isolation at short pump wavelengths such as 405 nm and 775 nm is bulky to be integrated into the proposed compact engine.

In one aspect of the present invention, a fiber Bragg grating (FBG) can be incorporated into the interferometric loop to function as a wavelength selective element of the back-routed power. For example, the pump laser diode is replaced with a gain chip, or what is also called a semiconductor optical amplifier. The laser cavity extending from the back-facet of the gain chip is closed by the FBG. Thus, the routed-back photons are deployed in part of this invention to serve the goal of miniaturizing the engine. At the same time, this improves the coherence length and spectral stability and purity of the pump photons, which can serve to improve the photon pairs' entanglement quality. The gain chip is commercially available in a regular TO-Can package such as 5.6 mm or 9 mm. The concept of using an FBG to extend the cavity length of a gin chip is effective for linewidth reduction; therefore, the intracavity photons lifetime is extended leading to narrow linewidth single-peak operation. The power reflectivity of the narrow-band FBG can be easily designed to balance the bi-directional pump delivered to each side of the PPNW, placed in the interferometric loop.

In a further aspect, a compact host engine enables the use of the simplest configuration of entangled-photon sources with a minimum number of optical components. Highly stable performance, high-coupling efficiency and outstanding photon collection and delivery and thus, remarkable brightness can be obtained. The compact housing can function as a heatsink for the pump diode. Moreover, it can be placed on a small thermoelectric cooler (TEC) for thermally stabilizing the PPNW and/or the FBG if used in the design.

The spectral bandwidth of the photon pairs emission as well as the wavelengths of the daughter photons are determined by the type of the phase matching condition and the substance of the PPNW. For instance, Type-2 SPDC in PPLN and periodically poled potassium titanyl phosphate (PPKTP) produces photon pairs with a relatively narrow bandwidth at 1560 nm and 810 nm, respectively. Broader bandwidths and higher conversion efficiencies can be realized through type-0 SPDC in both materials at 1560 nm and 810 nm.

In one aspect, there is provided a wavelength conversion module comprising: an interferometric engine coupled to a PPNW for generating photon polarization entanglement or hyperentanglement via SPDC.

In a further aspect, there is provided a wavelength conversion module wherein the PPNW can be a single PPNW or multiple or consecutive PPNWs.

In a further aspect, there is provided a wavelength conversion module wherein said interferometric engine comprises a dichroic filter; a PBS; and a noise-suppression filter; wherein the dichroic filter, PBS and noise-suppression filter are integrated into a compact housing, which is coupled to an interferometric PM fiber via the PBS.

In a further aspect, there is provided a wavelength conversion module wherein said dichroic filter is an input filter selected from the group consisting of short-pass, long-pass and band-pass, with a 45° angle of incidence.

In a further aspect, there is provided a wavelength conversion module further comprising a pump diode, wherein said dichroic filter directs a beam from the pump diode to the PBS and directs photon pairs from the PBS to one output port.

In a further aspect, there is provided a wavelength conversion module wherein said compact housing provides one or two output ports facing the noise-suppression filter.

In a further aspect, there is provided a wavelength conversion module wherein said compact housing provides two output ports; and wherein said dichroic filter directs photon pairs to one of the two output ports and the PBS directs photon pairs to another of the two output ports.

In a further aspect, there is provided a wavelength conversion module wherein the noise-suppression filter is a single or multiple noise-suppression filter.

In a further aspect, there is provided a wavelength conversion module wherein the noise suppression filter is configured to have a high suppression ratio to eliminate pump photons, fluorescence noise photons or any wavelength components other than entangled photon pairs wavelengths.

In a further aspect, there is provided a wavelength conversion module wherein the noise suppression filter is arranged at the output port.

In a further aspect, there is provided a wavelength conversion module wherein said PBS routes the pump photons, delivered through the dichroic filter from the pump diode, into a fiber-based polarization Sagnac loop formed from the interferometric PM fiber and said PBS routes photons pairs from the Sagnac loop towards the output ports.

In a further aspect, there is provided a wavelength conversion module wherein said pump photons are linearly polarized and exit the PBS towards the loop with two orthogonal linear polarization states.

In a further aspect, there is provided a wavelength conversion module wherein the polarization states are aligned to a slow axis or a fast axis of the fiber-based polarization Sagnac loop.

In a further aspect, there is provided a wavelength conversion module wherein the PBS feeds pump photons through both ends of the Sagnac loop.

In a further aspect, there is provided a wavelength conversion module wherein the pump photons counter-propagate within the loop.

In a further aspect, there is provided a wavelength conversion module wherein said interferometric PM fiber comprises polarization maintaining propagation medium for both pump and pairs wavelengths.

In a further aspect, there is provided a wavelength conversion module wherein the propagation medium is a broadband spatial single-mode PM photonic crystal fiber or a specialty PM fiber configured to show a weak multimode behavior at short wavelengths.

In a further aspect, there is provided a wavelength conversion module further comprising an optical isolator following the pump diode within said compact housing.

In a further aspect, there is provided a wavelength conversion module wherein said compact housing accommodates the pump diode within the housing, or wherein said compact housing comprises an input port for the pump diode located external to the compact housing.

In a further aspect, there is provided a wavelength conversion module wherein the pump diode located external to the compact housing is pulsed, continuous, coupled to an optical fiber, or collimated in free-space.

In a further aspect, there is provided a wavelength conversion module further comprising a polarizer configured to enhance a polarization extinction ratio of the pump beam.

In a further aspect, there is provided a wavelength conversion module further wherein said compact housing comprises a rotatable half-wave plate or an elector-optical birefringent medium located prior to the PBS to control s- and p- polarization components of the linearly polarized pump photons—to tune generation rates of photon pairs.

In a further aspect, there is provided a wavelength conversion module wherein the two output ports can be either coupled to fiber optics or provided with lenses for free-space applications.

In a further aspect, there is provided a wavelength conversion module wherein said interferometric PM fiber comprises cross-spliced sections and the PPNW is placed at a center of the interferometric PM fiber.

In a further aspect, there is provided a wavelength conversion module wherein said interferometric PM fiber incorporates an FBG and a built-in gain chip to bi-directionally pump the PPNW.

In a further aspect, there is provided a wavelength conversion module further comprising a TEC and wherein said compact housing functions as a heatsink when placed on the TEC to thermally stabilize the pump diode.

In a further aspect, there is provided a wavelength conversion module wherein said compact housing functions as a mechanical substrate and thermally stabilized heatsink holding the PPNW and/or FBG.

BRIEF DESCRIPTION OF THE DRAWINGS

The invention will be further understood from the following description with reference to the attached drawings illustrating example embodiments.

DETAILED DESCRIPTION

Figure 1:
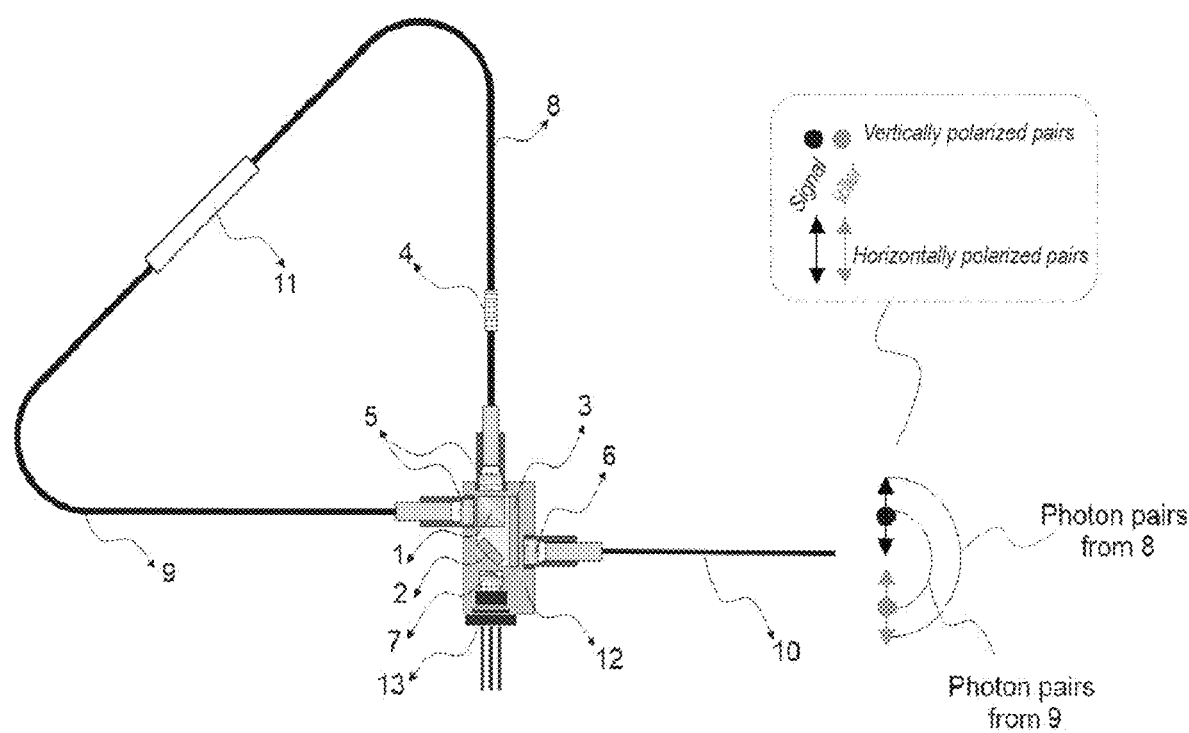
FIG. 1 illustrates a schematic representation showing an interferometric engine that accommodates type-0 (or type-1) PPNW.

An exemplary embodiment of the disclosed invention will be set forth in detail with reference to the drawings, in which like reference numerals refer to like elements or method steps throughout.

FIG. 1 shows one example embodiment of a schematic representation showing the interferometric engine 12 that accommodates type-0 (or type-1) PPNW 11 including the pump diode 13, short-pass dichroic filter (or WDM plate 2) at 45° angle of incidence, PBS 1 and output noise-suppression filter 3. An FBG 4 is incorporated into the PM fiber arm 8 of the Sagnac loop, whose center is occupied by the PPNW 11. The output port is coupled to a single-mode output fiber 10 delivering the polarization entangled pairs, whose polarization states are illustrated in the inset. The lenses 5 are achromatic lenses to optimize the optical coupling efficiency at wavelengths of the pump photons and photon pairs. Lens 6 couples the photon pairs exiting the loop into the single-mode output fiber 10. Lens 7 is used to collimate the pump beam entering the loop.

Figure 2:
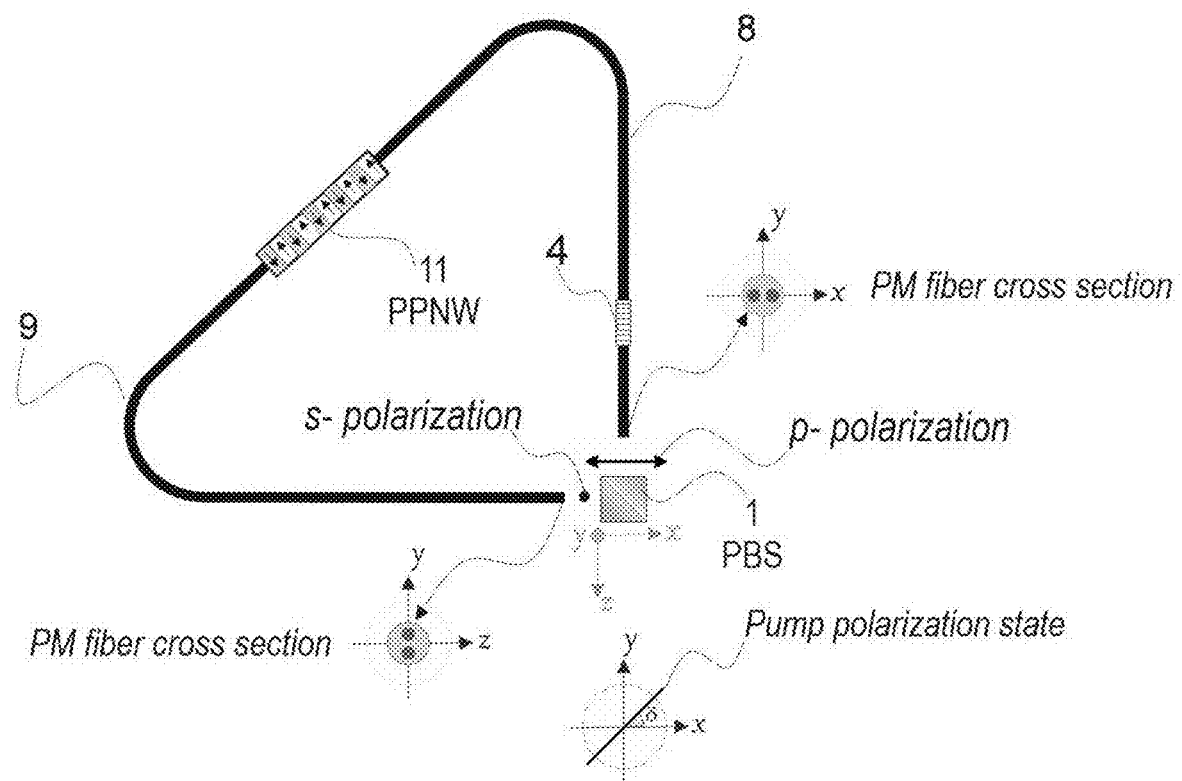
FIG. 2 illustrates the polarization state of the pump photons in xy-plane defined by δ while the beam enters the PBS in the −z direction.

FIG. 2 shows an example embodiment wherein the polarization state of the pump photons in xy-plane is defined by δ while the beam enters the PBS 1 in the −z direction. The beam is linearly polarized and is split via δ to p-polarization component along x-axis and s-polarization component along y-axis. Both polarization components are coupled to the slow axes of the PM fiber arms 8 and 9, respectively, that form the Sagnac loop. The PPNW 11 can be placed in the center of the loop.

Figure 3:
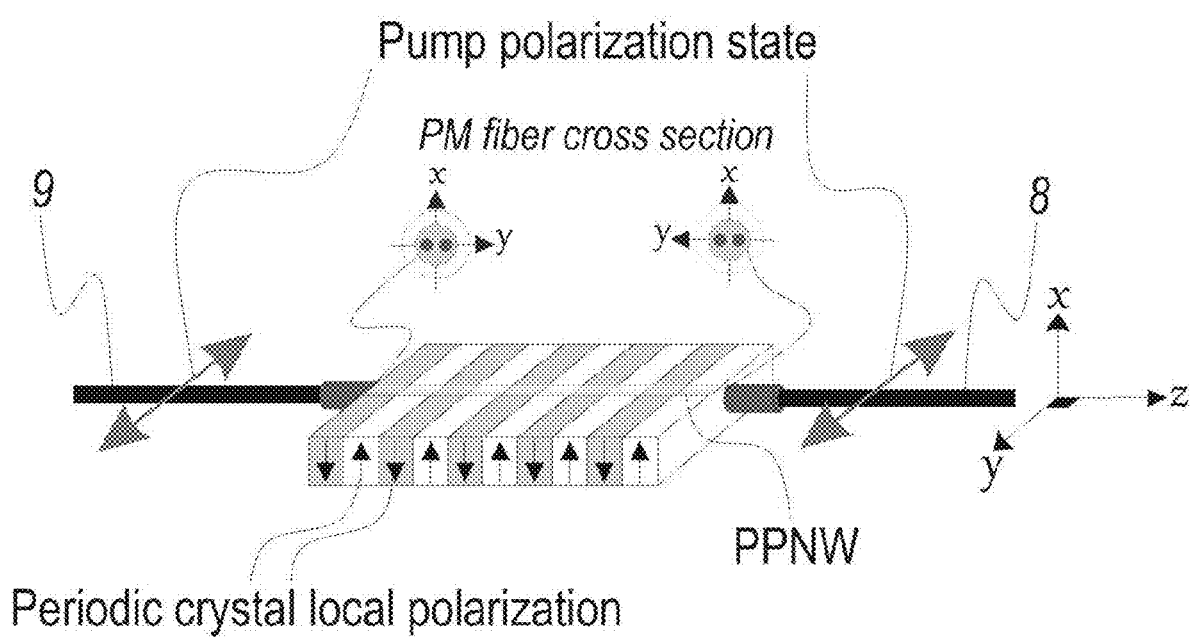
FIG. 3 illustrates a diagram of a PPNW geometry in Cartesian coordinates demonstrating the orientation of the crystal's local electric field, which is periodically flipped in the ±x direction.

FIG. 3 shows an example embodiment illustrating a diagram of a PPNW geometry in Cartesian coordinates demonstrating the orientation of the crystal's local electric field, which is periodically flipped in the ±x direction. The polarization states of the pump photons in both directions are coupled into the slow axis of the loop PM fiber and into the PPNW along y-axis. Clockwise propagating pump photons delivered through the fiber arm 9 and counter-clockwise propagating pump photons routed in fiber arm 8 are considered in +z and −z directions, respectively. The PPNW can be placed in the center of the Sagnac loop.

Figure 4A:
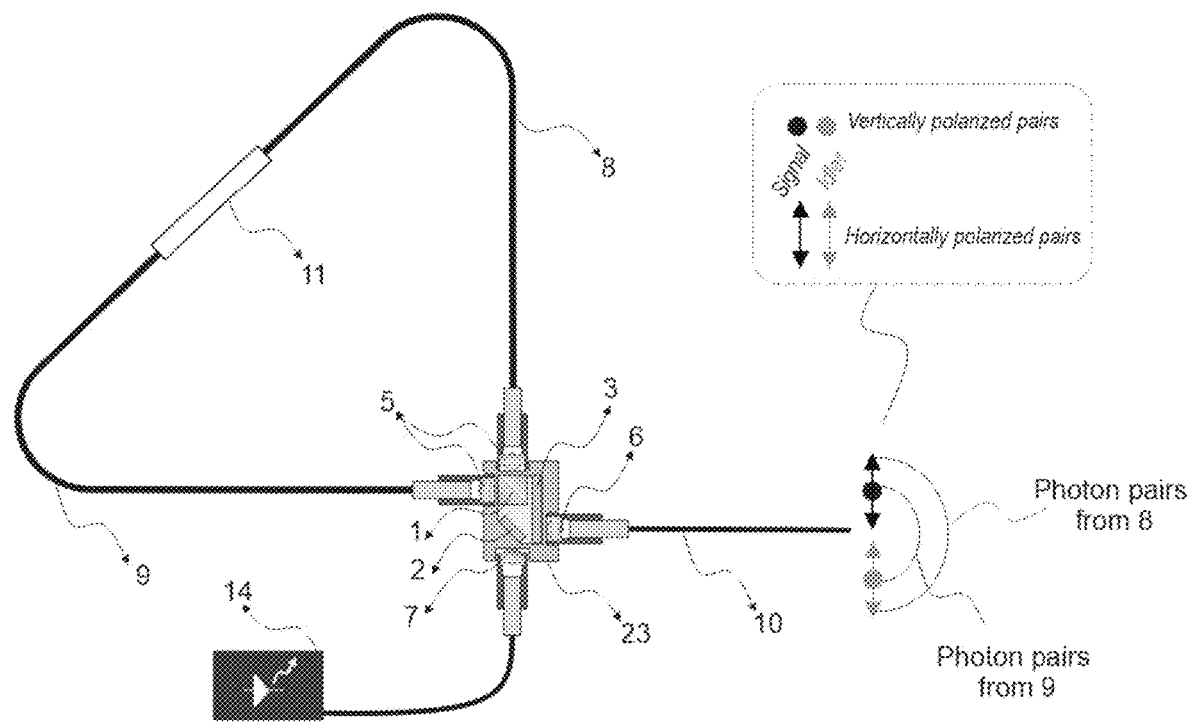
FIG. 4A illustrates a schematic representation of the interferometric engine for type-0 (or type-1) PPNW with an extra port for coupling an external pump laser module.
Figure 4B:
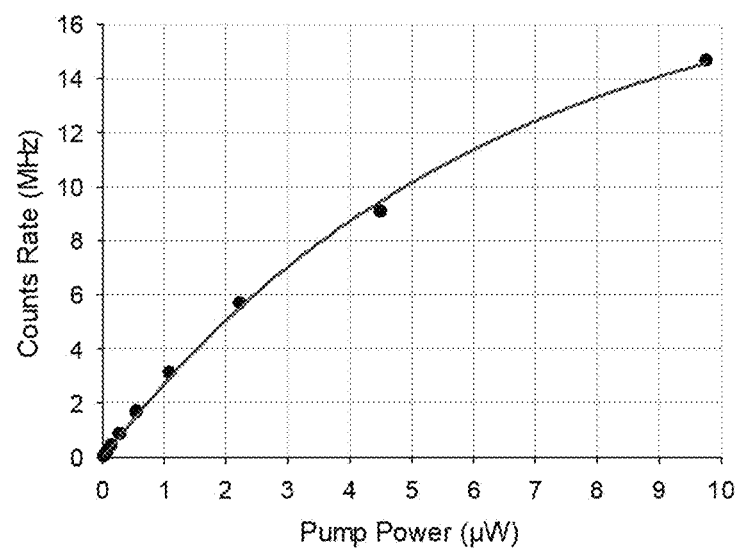
FIG. 4B illustrates a graph of counts rate versus pump power for the arrangement of FIG. 4A.

FIG. 4A shows an example embodiment of a schematic representation of the interferometric engine 12 for type-0 (or type-1) PPNW 11. It provides an extra port for coupling an external pump laser module 14. The linearly polarized light is delivered via a polarization maintaining fiber to the PBS 1 via the WDM plate 2. The PPNW 11 is placed in the Sagnac loop while the lengths of both PM fiber arms 8 and 9 are balanced to some extent. The output port is coupled to a single-mode fiber delivering the polarization-entangled photon pairs, whose polarization states are shown in the insert. The photon pairs are filtered out by the pump- and noise-removal filter, namely the output noise-suppression filter 3. The lenses 5 are achromatic lenses to minimize the insertion loss for pump photons and photon pairs. Lens 7 is used to collimate the pump beam entering the loop. Lens 6 couples the photon pairs exiting the loop into the output fiber 10. FIG. 4B shows a graph of counts rate of the photon pairs, generated by at type-0 PPLN waveguide, as a function of the pump power. The spectral bandwidth is about 90 nm and centered at 1550 nm.

Figure 5:
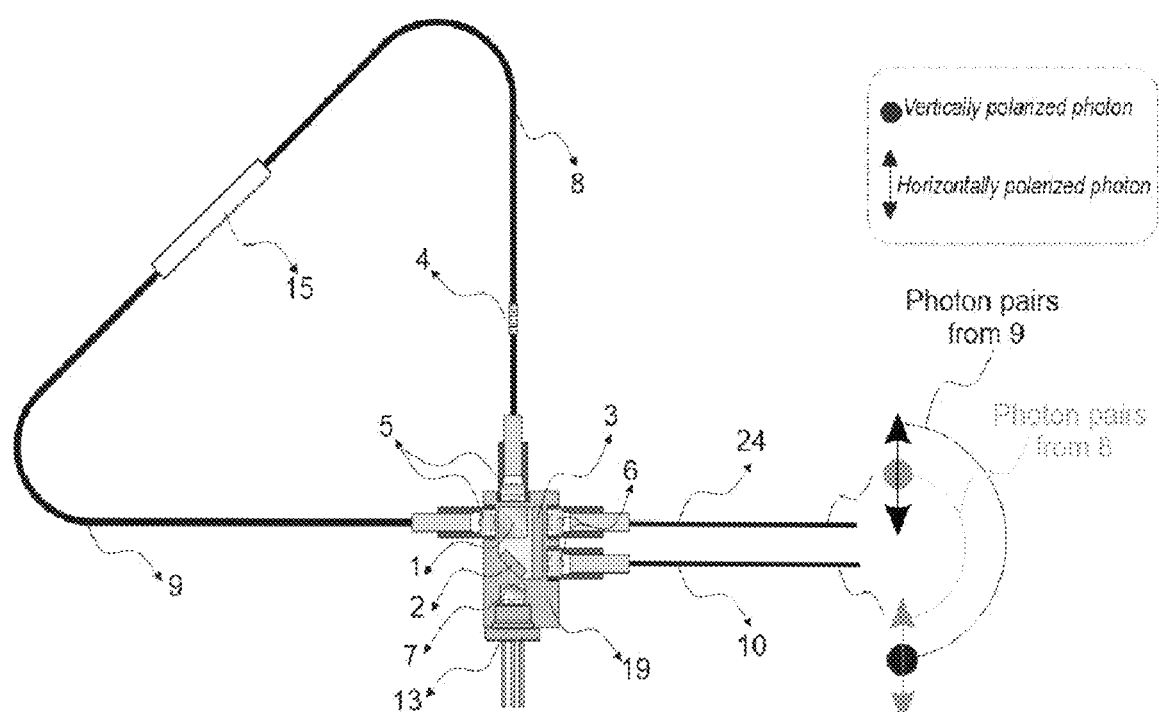
FIG. 5 illustrates a schematic diagram showing the interferometric engine for type-2 PPNW including a pump diode, WDM plate, PBS and output filter.

FIG. 5 shows an example embodiment of a schematic diagram showing the interferometric engine 19 for type-2 PPNW 15 including the pump diode 13, WDM plate 2, PBS 1 and output filter 3. An FBG 4 is written on the PM fiber forming the Sagnac loop, whose center is occupied by the PPNW 15. The two output ports are coupled to single-mode output fibers 10 and 24 delivering the polarization-entangled photon pairs. Through the PBS 1, the achromatic lenses 5 are used to couple the pump photons into the Sagnac loop and collect photon pairs exiting the loop. Lens 7 is used to collimate the pump beam entering the loop. Lens 6 is used to couple the photon pairs exiting the loop into the output fibers 10 and 24.

Figure 6A:
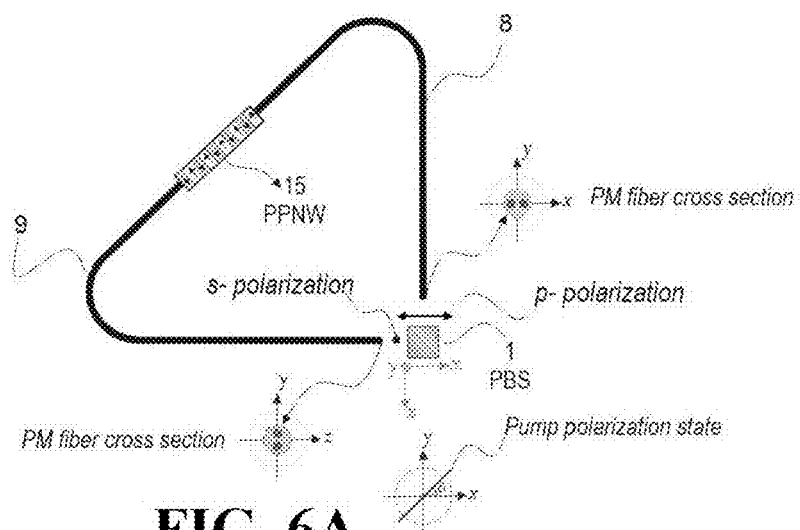
FIG. 6A illustrates the polarization state of the pump photons in xy-plane defined by δ. PBS

FIG. 6A shows an example embodiment illustrating the polarization state of the pump photons in xy-plane defined by δ. The beam entering the PBS 1 in the −z direction is split to p-polarization component along x-axis and s-polarization component along y-axis. These two components are coupled to the slow axes of the PM fiber arms 8 and 9, respectively. The type-2 PPNW 15 is placed in the center of the Sagnac loop.

Figure 6B:
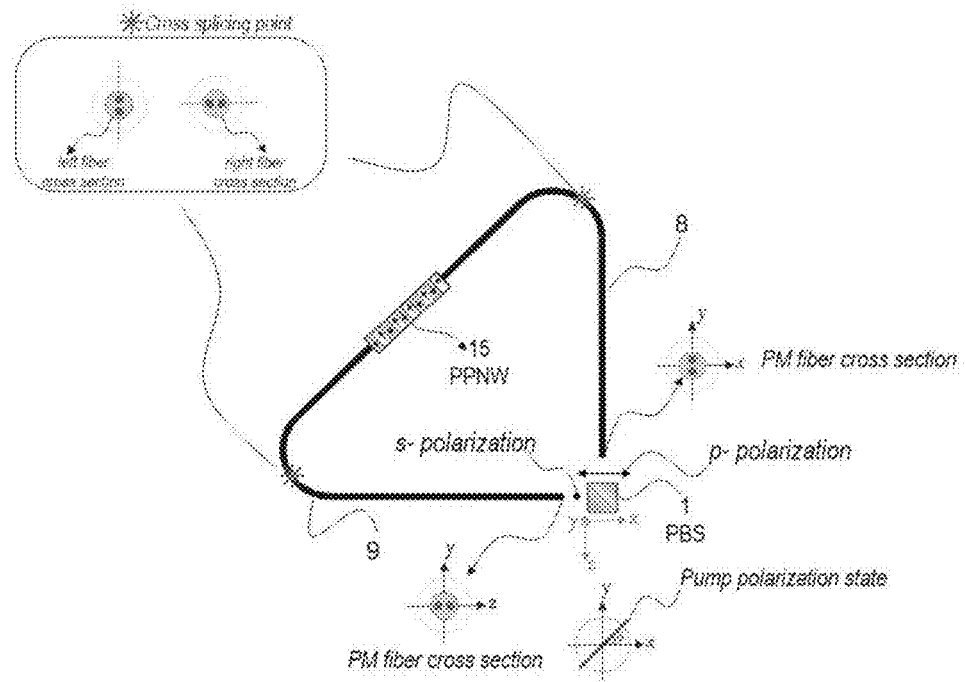
FIG. 6B illustrates the p-polarization component along x-axis and s-polarization component along y-axis coupled to the fast axes of the PM fiber arms.

FIG. 6B shows an example embodiment illustrating the p-polarization component along the x-axis and the s-polarization component along the y-axis being coupled to the fast axes of the PM fiber arms 8 and 9, respectively. The PPNW 15 is placed in the center of the Sagnac loop and the two arms are cross-spliced in the middle.

Figure 7A:
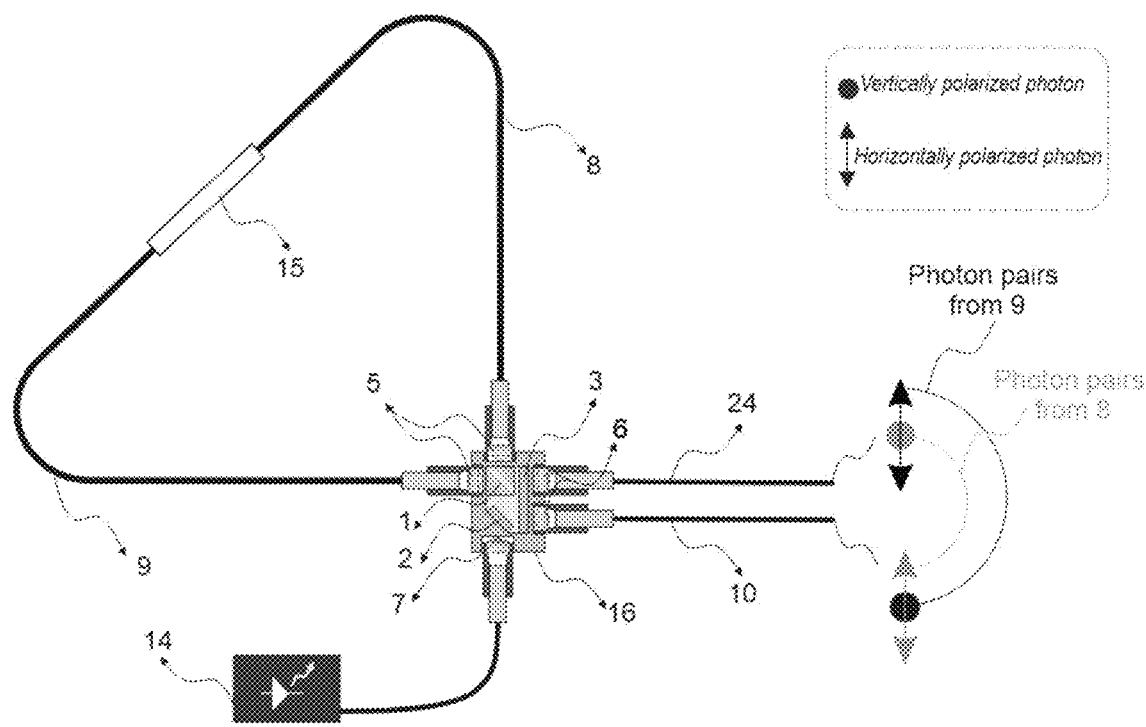
FIG. 7A illustrates a schematic diagram showing the compact engine accommodating type-2 PPNW including a port for coupling an external pump laser module.

FIG. 7A shows an example embodiment of a schematic diagram illustrating the compact engine 16 accommodating type-2 PPNW 15 including a port for coupling an external pump laser module 14. The pump light is linearly polarized and delivered via a polarization maintaining fiber to the PBS 1 after getting reflected by the WDM plate 2 at 45°. The Sagnac loop's center is occupied by the PPNW 15. The two output ports are coupled to single-mode output fibers 10 and 24 delivering the polarization-entangled pairs after getting filtered by the pump- and noise-removal filter, e.g. an output noise-suppression filter 3. The achromatic lenses 5 are used to couple the pump photons into the loop and deliver photon pairs through the PBS 1. Lens 7 is used to collimate the pump beam entering the loop. Lens 6 couples the photon pairs exiting the loop into the output fibers 10 and 24.

Figure 7B:
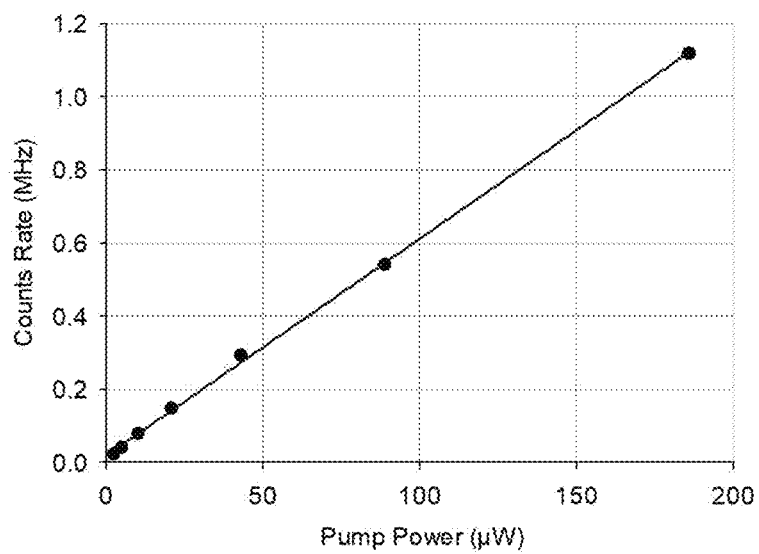
FIG. 7B illustrates a graph of counts rate versus pump power for the arrangement of FIG. 7A.

FIG. 7B shows a graph of counts rate of the photon pairs, generated by at type-2 PPLN waveguide, as a function of the pump power. The spectral bandwidth is about 2 nm and centered at 1550 nm.

Figure 8:
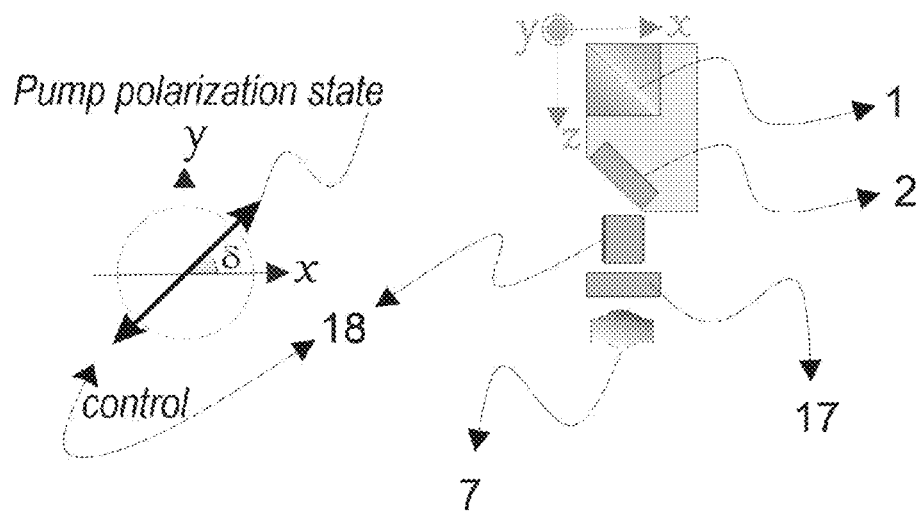
FIG. 8 illustrates a schematic illustration of the possible integration of a polarization state rotator, placed prior to the short-pass dichroic filter (or WDM plate).

FIG. 8 shows an example embodiment of a schematic illustration of the possible integration of a polarization state rotator 18, placed prior to the short-pass dichroic filter (or WDM plate) 2. This polarization state rotator 18 can be a rotatable half-wave plate or an electro-optical birefringent crystal. It is used to precisely control δ in order to control the clockwise and counter-clockwise pump photons, delivered to the PPNW through s- and p-polarized components, respectively. An optional polarizer element 17 can be placed prior to the rotator 18 to enhance the polarization extinction ratio of the pump photons.

Figure 9:
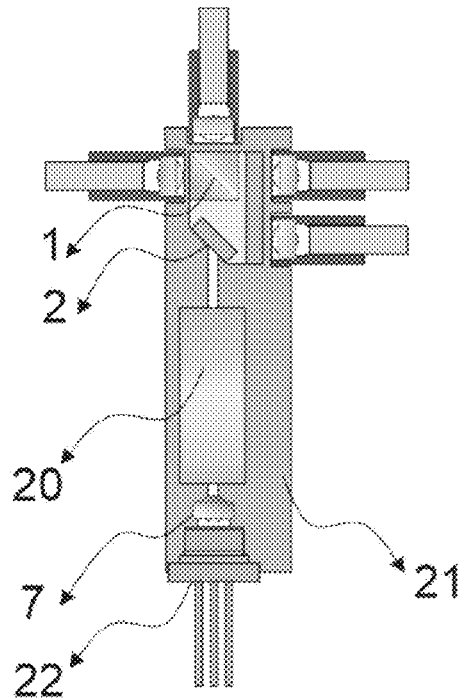
FIG. 9 illustrates a compact engine extended in size to accommodate an isolator anywhere prior to the WDM plate or PBS.

FIG. 9 shows that a compact engine can be extended in size to accommodate an isolator 20 anywhere prior to the WDM plate 2 (or PBS 1). In this case, a laser diode 22 can be integrated into the engine 21 while the FBG 4 is taken off.

One aspect of the present invention involves a generic host engine which is carefully engineered to produce stable, compact and bright entangled-photon sources. Thus, the requirements of up-to-date quantum technologies can be met by:

i—Simplifying the design to allow for stable performance, cost reduction and low power consumption.
ii—Optimizing the functions of the involved optical components to improve photon conversion rate and enhance heralding efficiency for fiber-based and satellite communication.
iii—Accommodating the sensitive optical components within a compact and mechanically rugged body, which is resistant to strong vibrations and thermal fluctuations, such that the sources comply with the severe requirements of space-flight operations.
iv—Fully integrable source with flexible operating conditions and simple mechanical installation.

Capitalizing on the inherent stability, auto-balance and durability of a fiber-based Sagnac interferometer, a PPNW is coupled to the PM fiber constructing the loop. The photon pairs, generated through SPDC process, are fully guided inside the loop and efficiently coupled to the output ports to produce bright polarization-entangled sources. Moreover, the interferometric PM fiber can be also deployed as a host medium of an FBG that allows the integration of a pump diode/gain chip within the module. This serves the purpose of building a source that is simple in structure, compact in size, light in weight and rugged enough to sustain the implementation in space. Furthermore, various spectral specifications along with the tunable generation rate of the photon pairs can be realized by hosting a suitable PPNW. The substance of this PPNW such as PPLN and PPKTP and the SPDC type are variable that can be controlled to meet the required specs.

A) Broadband Polarization-Entangled Photon Sources

In one aspect of this invention, there is presented a highly stable interferometric broadband polarization-entangled photon source. Photon pairs are generated within a type-0 PPNW 11, placed in the center of a PM fiber-based Sagnac interferometer. The compact interferometric engine can accommodate a built-in pump diode 13 (gain chip) as shown in FIG. 1 or accept an external pump laser module 14 or source, depicted in FIG. 4A.

Such an interferometer can include the use of a single PPNW 1, shown in FIG. 1, that is bi-directionally pumped for generating polarization entanglement. However, this exact configuration implies a penalty of routing the pump power back to the laser source. The pump laser diode can be protected using an isolator to ensure the laser spectral and power stability realize its full lifetime. In previous arrangements, this usually required a separate external laser module followed by an isolator, which is bulky, especially at short pump wavelengths, to be integrated into a compact engine as intended.

In the present disclosure, the concept of incorporating an external cavity laser into a fiber passed Sagnac loop to build entangled photon sources is set forth. In one aspect, the laser cavity of a semiconductor optical amplifier (a gain chip) or pump diode 13 is extended through the anti-reflection coated window, located at the chip front facet. The external laser cavity can be terminated with a short FBG 4, formed on the interferometric PM fiber 8 as shown in FIG. 1. The FBG 4 functions as an external reflector and output coupler. The laser cavity is closed at the other end by the high reflective back facet of the pump diode 13.

Therefore, the intracavity photons lifetime is extended, which leads to narrow linewidth single-peak operation. This approach converts the aforementioned penalty to a desired optical feedback. In an external cavity laser, such strong optical feedback is necessary to increase the coherence time of the pump laser. Ultimately, this can serve to improve the entanglement quality and enables the integration of a pump diode 13 into such a unique interferometric engine 12. The pump diode 13 is commercially available in 5.6-mm and 9-mm TO-can package.

As shown in the example embodiment of FIG. 1, the engine 12 can accommodate a pump diode 13, followed by a short-pass (or alternatively bandpass) dichroic filter plate, i.e. WDM plate 2, 3-mm dual-wavelength PBS 1 and noise-suppression filter 3. In one example arrangement, the dichroic filter plate is set at 45° angle of incidence and has an anti-reflection coating. The engine block can contain four small windows accepting the lens holders with enough clearance to perform precise tilt alignment. Four coupling lenses can be used. An aspheric lens 7 can be included for delivering the pump photons. Two achromatic lenses 5 can be included for coupling pump photons and photon pairs. A lens 6 can be included at photon pairs for coupling the photon pairs into a single-mode output fiber 10. The Sagnac loop can be constructed using a PM fiber, where the PPNW 1 is a type-0 (or type-1) and placed in the loop center. The FBG 4 can be incorporated into the fiber-based loop to force the pump diode to oscillate at the required wavelength. The wavelength of a single operating peak (or mode) dominating gain mode competition is associated with a minimum intra-cavity loss.

The function of the interferometric engine 12 starts when the linearly polarized collimated beam exiting the first lens 7 passes through the WDM plate 2. The PBS 1 receives that beam and splits it based on the angle δ to two beams with orthogonal polarization states. p-polarized photons are transmitted forward and s-polarized photons are reflected as shown in FIG. 2. These two beams are respectively coupled to the slow axis of the PM fiber arms 8 and 9 via the two achromatic lenses 5. The PBS 1 preferably operates at two or multiple wavelengths of the three photons involved in the SPDC as mentioned earlier. Since the FBG 4 is placed in the fiber arm 8, δ is<45° and is preferably tuned in order to balance the counter-propagating pump photons in the loop. Thus, PBS 1 feeds the PPNW 11 pump photons from both sides.

FIG. 3 illustrates the orientation of the polarization state of the pump photons, confined to the slow axis of the Sagnac fiber loop, with respect to a given PPNW, where the PM fiber of one arm is twisted by 90°. The photon pairs are born in the PPNW 11 through SPDC. The counter-propagating photon pairs are then spatially recombined into a single beam via the PBS 1. This beam has two orthogonal polarization components as shown in the inset of FIG. 1. The PBS 1 also recombines the pump photons counter-propagating throughout the loop into the same spatial beam that is directed back to the pump diode 13. The WDM plate 2 redirects the photon pairs also into the output port after the beam passes the noise-suppression filter 3. The photon pairs are finally coupled to a single-mode output fiber 10 with a complete indistinguishability between the horizontally and vertically polarized photon pairs, which are received from fibers 8 and 9, respectively.

In the case of type-0 PPLN for example, the spectral bandwidth of the photon pairs is about 90 nm, centered at 1550 nm, while the pump diode operates at 775 nm with a single-peak and narrow linewidth.

In one aspect, the proposed approach does not only lead to a compact engine with a built-in pump laser but also boosts the entanglement quality. This implies the use of a minimum number of coupling lenses, which enhances photons collection efficiency.

In another embodiment, the engine 12 is modified to be coupled to an external pump laser module 14 with an in-line isolator as shown in FIG. 4A. The FBG 4 is removed and the pump diode is replaced with a window accommodating the holder of an aspheric lens 7. Such a module 23 or engine can be suitable for building entangled photon sources that can be driven by a pulsed or continuous external pump laser. The pump photons are linearly polarized and can be delivered in free-space as a collimated beam or via a PM fiber as demonstrated in FIG. 4A. The angle δ illustrated in FIG. 2, is set to about 45° to balance the counter-propagating photon pairs generation. The photon pairs are delivered to the output fiber 10, where they are vertically or horizontally polarized as represented in FIG. 4A.

Thus, entangled photon sources with the highest possible brightness and best heralding efficiency can be manufactured. For example, in the case of type-0 PPLN, the spectral bandwidth of the photon pairs is about 90 nm, centered at 1550 nm. The counts rate or pairs generation rate as a function of the pump power is measured and plotted in FIG. 4B.

In a further aspect, the compact body of the interferometric engine 12 (or module 23) can be mounted on a TEC to allow a proper thermal management while the pump diode is thermally stabilized. The body can also be used as a mechanical substrate to hold the PPNW 11 and/or FBG 4 while tuning the phase matching and/or Bragg wavelength, respectively, via a single TEC.

B) Narrow-Band Polarization-Entangled Photon Sources

In another embodiment, the Type-0 PPNW 11, used in the previous embodiment, can be replaced with a type-2 PPNW 15 as shown in FIG. 5. Consequently, the interferometric engine 12 is altered to provide a second output port, shown in interferometric engine 19 that has two output ports 10 and 24. The implantation of Type-2 crystals in a Sagnac interferometer is also discussed in the following references: Sanaka, K., Kawahara, K. & Kuga, T. New high-efficiency source of photon pairs for engineering quantum entanglement. Phys. Rev. Lett. 86, 5620-5623 (2001); T. Kim, M. Fiorentino, and F. N. C. Wong, "Phase-stable source of polarization-entangled photons using a polarization sagnac interferometer," Phys. Rev. A 73, 012316 (2006); Sagnac-type entangled photon source using only conventional polarization optics, Youn Seok Lee3,1, Mengyu Xie1,2, Ramy Tannous1 and Thomas Jennewein Published 13 Jan. 2021•© 2021 IOP Publishing Ltd, Quantum Science and Technology, Volume 6, Number 2; Evan Meyer-Scott, Nidhin Prasannan, Christof Eigner, Viktor Quiring, John M. Donohue, Sonja Barkhofen, and Christine Silberhorn, "High-performance source of spectrally pure, polarization entangled photon pairs based on hybrid integrated-bulk optics," Opt. Express 26, 32475-32490 (2018); and Ana Predojević, Stephanie Grabher, and Gregor Weihs, "Pulsed Sagnac source of polarization entangled photon pairs," Opt. Express 20, 25022-25029 (2012).

In this embodiment, sketched in FIG. 5, linearly-polarized pump photons enter the PBS 1 within a single spatial beam at a polarization angle δ, described in FIG. 6A. Due to the FBG power reflectivity, the angle δ shall be tuned to balance the bi-directional pump photons, injected in either side of the PPNW 15. This occurs when the PBS 1 splits the pump photons into p- and s-polarization components. The components are coupled to the slow axes of the PM fibers forming the loop's fiber arms 8 and 9, respectively. This leads to counter-propagating pump photons, whose polarization states are defined in FIG. 3, entering the type-2 PPNW 15 from both sides simultaneously. Photon pairs are consequently generated via SPDC and propagate in both directions. The two sets of photon pairs counter-propagating in the Sagnac loop meet each other at the PBS 1. Two entangled photons of one pair are split and recombined with two separated entangled photons of the other pair. The resultant two new combinations or pairs will be spatially directed to two output ports or output fibers 10 or 24 as illustrated in the inset of FIG. 5. Each combination has two orthogonally-polarized photons while the photon pairs of the two output ports are simultaneously entangled in polarization and frequency. The PM fiber is twisted by 90° throughout the loop to satisfy the correct pump polarization, illustrated in FIG. 3. Therefore, the daughter photons of a new combination, whose polarization states are coupled to either the slow or fast axis of the PM fiber, will exit the interferometer at the same time and are routed to the same output port. Thus, at each output port, the information about the direction in which the conversion occurred is erased and coherent detection is achieved.

Based on the type-2 PPNW 15 substance and poling condition, if the wavelength of a daughter photon (whether it is signal or idler) is not correlated to a specific polarization state, that daughter photon can be delivered to either output fiber 10 or 24. In this case, simultaneous entanglement in polarization and frequency occurs and thus, hyperentangled photon sources can be produced. The temporal walk-off, caused by the dispersion effect in the PM fiber-based loop, can be minimized to be trivial and below the single-photon detector timing jitters. This can optionally be realized by placing the PPNW 15 in the middle of the Sagnac loop within a reasonable tolerance.

The functions of the other optical components, shown in FIG. 5, which are not mentioned in this embodiment were already explained in detail in the description of the previous embodiment, depicted in FIG. 1.

Considering the photon pairs delivered to output ports 10 and 24, the beat length of the loop PM fiber can lead to a temporal walk-off. This can be optionally addressed by cross-splicing the PM fiber-based arms of the Sagnac loop in two points, illustrated with a star * in FIG. 6B. The position of each cross-splice point * can be in the middle of the corresponding fiber arm 8 or 9 with a reasonable tolerance. The optical lengths of these two arms are preferably approximately equal with a sufficient length tolerance.

The compact housing constituting the interferometric engine 19 (or engine 16) can be mounted on a small TEC to stabilize the pump diode temperature. It can be also deployed as a substrate holding the PPNW 15 and/or FBG 4 so that the phase matching condition and Bragg wavelength can be tuned and stabilized properly.

In the example embodiment, shown in FIG. 7A, the engine is slightly modified to accept an external pump laser module 14 that can be followed by an isolator. The FBG 4 is removed and the pump diode is replaced with a window accommodating the holder of an aspheric lens 7. The interferometric module or compact engine 16 can be deployed in entangled photon sources that can be driven by a pulsed or continuous-wave pump laser. The pump photons are linearly polarized and can be delivered in free-space as a collimated beam or via a PM fiber as demonstrated in FIG. 7A. The angle δ, illustrated in FIG. 6A, is set to about 45° to balance the counter-propagating photon pairs. For instance, in the case of type-2 PPLN, the spectral bandwidth of the photon pairs is about 2 nm, centered at 1550 nm. The counts rate or pairs generation rate as a function of the pump power is measured and plotted in FIG. 7B.

It should be noted that the PPNW in the previous embodiments can be PPLN based or PPKTP based for degenerate or near-degenerate SPDCs. However, this invention including the engines, modules and method are not limited to that. The interferometric engine or module can be modified to accommodate a polarizer element 17 to enhance the polarization extinction ratio of the pump beam as depicted in FIG. 8. Also, a half-wave plate, electro-optical birefringent crystal, or polarization state rotator 18 can be integrated to remotely and actively tune the polarization state angle, δ. This helps to accurately balance the counter-propagating photon pairs, guided in the interferometric fiber arms 8 and 9 and received by either side of the PPNW.

The engines 12 and 19, shown in FIG. 1 and FIG. 5 respectively, can be extended in size to accommodate an isolator 20 as shown in FIG. 9. The isolator 20 can be placed between the pump lens 7 and the WDM plate 2. In this case, the pump diode (gain chip) can be replaced with a pump laser diode 22 that is commercially available in a TO-Can or a butterfly package. The isolator 20 protects the laser diode 22 from the back reflected power, received from the Sagnac loop, while the FBG 4 is removed. The isolator can be made using a Faraday rotator combined with a polarizer plate or a PBS operating at the pump wavelength.

Following from the above description, it should be apparent to those of ordinary skill in the art that, while the methods and apparatuses herein described constitute exemplary embodiments of the present invention, the invention described herein is not limited to any precise embodiment and that changes may be made to such embodiments without departing from the scope of the invention as defined by the claims. Consequently, the scope of the claims should not be limited by the preferred embodiments set forth in the examples but should be given the broadest interpretation consistent with the description as a whole. Likewise, it is to be understood that it is not necessary to meet any or all of the identified advantages or objects of the invention disclosed herein in order to fall within the scope of any claims, since the invention is defined by the claims and since inherent and/or unforeseen advantages of the present invention may exist even though they may not have been explicitly discussed herein. The amounts, sizes and examples discussed herein are for example purposes only and should not limit the scope of the claims or variants thereof which would be understood by a person of skill in the art.

I claim:

1. A wavelength conversion module comprising:
   an interferometric engine comprising a polarization maintaining (PM) fiber and coupled to a periodically poled nonlinear waveguide (PPNW) for generating photon polarization entanglement or hyperentanglement via spontaneous parametric down conversion (SPDC).

2. The wavelength conversion module of claim 1 wherein the PPNW can be a single PPNW or multiple or consecutive PPNWs.

3. The wavelength conversion module of claim 1 wherein said interferometric engine comprises a dichroic filter; a PBS; and a noise-suppression filter;
   wherein the dichroic filter, PBS and noise-suppression filter are integrated into a compact housing, which is coupled to an interferometric PM fiber via the PBS.

4. The wavelength conversion module of claim 3 wherein said dichroic filter is an input filter selected from the group consisting of short-pass, long-pass and band-pass, with a 45° angle of incidence.

5. The wavelength conversion module of claim 3 further comprising a pump diode, wherein said dichroic filter directs a beam from the pump diode to the PBS and directs photon pairs from the PBS to one output port.

6. The wavelength conversion module of claim 5 wherein the noise suppression filter is arranged at the output port.

7. The wavelength conversion module of claim 5 wherein said PBS routes the pump photons, delivered through the dichroic filter from the pump diode, into a fiber-based polarization Sagnac loop formed from the interferometric PM fiber and said PBS routes photons pairs from the Sagnac loop towards the output ports.

8. The wavelength conversion module of claim 7 wherein said pump photons are linearly polarized and exit the PBS towards the loop with two orthogonal linear polarization states.

9. The wavelength conversion module of claim 8 wherein the polarization states are aligned to a slow axis or a fast axis of the fiber-based polarization Sagnac loop.

10. The wavelength conversion module of claim 7 wherein the PBS feeds pump photons through both ends of the Sagnac loop.

11. The wavelength conversion module of claim 10 wherein the pump photons counter-propagate within the loop.

12. The wavelength conversion module of claim 3 wherein said compact housing provides one or two output ports facing the noise-suppression filter.

13. The wavelength conversion module of claim 3 wherein said compact housing provides two output ports; and wherein said dichroic filter directs photon pairs to one of the two output ports and the PBS directs photon pairs to another of the two output ports.

14. The wavelength conversion module of claim 13 wherein said two output ports can be either coupled to fiber optics or provided with lenses for free-space applications.

15. The wavelength conversion module of claim 3 wherein the noise-suppression filter is a single or multiple noise-suppression filters.

16. The wavelength conversion module of claim 15 wherein the noise suppression filter is configured to have a high suppression ratio to eliminate pump photons, fluorescence noise photons or any wavelength components other than entangled photon pairs wavelengths.

17. The wavelength conversion module of claim 3 wherein said interferometric PM fiber comprises polarization maintaining propagation medium for both pump and pairs wavelengths.

18. The wavelength conversion module of claim 17 wherein the propagation medium is a broadband spatial single-mode PM photonic crystal fiber or a specialty PM fiber configured to show a weak multimode behavior at short wavelengths.

19. The wavelength conversion module of claim 3 further comprising an optical isolator following the pump diode within said compact housing.

20. The wavelength conversion module of claim 3 wherein said compact housing accommodates the pump diode within the housing, or wherein said compact housing comprises an input port for the pump diode located external to the compact housing.

21. The wavelength conversion module of claim 20 wherein the pump diode located external to the compact housing is pulsed, continuous, coupled to an optical fiber, or collimated in free-space.

22. The wavelength conversion module of claim 3 further comprising a polarizer configured to enhance a polarization extinction ratio of the pump beam.

23. The wavelength conversion module of claim 3 further wherein said compact housing comprises a rotatable half-wave plate or an elector-optical birefringent medium located prior to the PBS to control s- and p-polarization components of the linearly polarized pump photons to tune generation rates of photon pairs.

24. The wavelength conversion module of claim 3 wherein said interferometric PM fiber comprises cross-spliced sections and the PPNW is placed at a center of the interferometric PM fiber.

25. The wavelength conversion module of claim 3 wherein said interferometric PM fiber incorporates an FBG and a built-in gain chip to bi-directionally pump the PPNW.

26. The wavelength conversion module of claim 3 further comprising a TEC and wherein said compact housing functions as a heatsink when placed on the TEC to thermally stabilize the pump diode.

27. The wavelength conversion module of claim 26 wherein said compact housing functions as a mechanical substrate and thermally stabilized heatsink holding the PPNW and/or FBG.

* * * * *